United States Patent [19]
Colbert et al.

[11] Patent Number: 4,492,876
[45] Date of Patent: Jan. 8, 1985

[54] POWER SUPPLY SWITCHING ARRANGEMENT

[75] Inventors: Raymond O. Colbert, Oaklandon; Bengt H. Hellman, Indianapolis, both of Ind.

[73] Assignee: AT&T Bell Laboratories, Murray Hill, N.J.

[21] Appl. No.: 514,596

[22] Filed: Jul. 18, 1983

[51] Int. Cl.³ ............................................. H02J 9/06
[52] U.S. Cl. ...................................... 307/66; 365/229
[58] Field of Search ....................... 307/44, 46, 64, 66; 365/229; 323/906, 272, 271

[56] References Cited

U.S. PATENT DOCUMENTS

| | | | |
|---|---|---|---|
| 3,414,802 | 12/1968 | Harrison et al. | 307/44 C |
| 3,577,003 | 5/1971 | Behr | 307/66 |
| 3,631,257 | 12/1971 | Behr | 307/66 |
| 3,696,286 | 10/1972 | Ule | 323/271 X |
| 4,122,353 | 10/1978 | Breikss | 307/64 |
| 4,288,865 | 9/1981 | Graham | 365/229 |
| 4,384,350 | 5/1983 | Lee et al. | 365/229 |
| 4,456,833 | 6/1984 | Traus et al. | 323/271 X |

OTHER PUBLICATIONS

"Ram Dons Lithium-cell Hat for Convenient Non-volatility" by Michael Bolan, Electronics 6/30/83, pp. 147-150.

*Primary Examiner*—A. D. Pellinen
*Assistant Examiner*—Derek S. Jennings
*Attorney, Agent, or Firm*—M. A. Morra

[57] ABSTRACT

In an electrical circuit where power supply interruptions may cause significant adverse consequences, a secondary battery is often used to maintain power when the load voltage falls below a predetermined threshold. MOS transistors interconnect primary and secondary voltage supplies with the load. A sequence control circuit assures that only one MOS transistor is on at any time. In one embodiment of the invention, different time constants cause all MOS transistors to turn off before changing voltage supplies. In another embodiment of the invention, voltage comparators, each having a different threshold, cause all MOS transistors to turn off before changing voltage supplies. A capacitor maintains the load voltage during switching and positive feedback assures that the switching interval is brief. This arrangement is particularly advantageous in low power applications utilizing one or more lithium batteries.

11 Claims, 2 Drawing Figures

POWER SUPPLY SWITCHING ARRANGEMENT

FIELD OF THE INVENTION

This invention relates to apparatus for switching between primary and secondary voltage sources and more particularly to control circuitry associated therewith.

BACKGROUND OF THE INVENTION

In a number of applications, there is a need to provide a constant source of power so that critical equipment will not be adversely effected by power interruptions. Such critical equipment includes microprocessors and electronic memories having large quantities of stored information that is lost when power is temporarily removed. This type of storage is often labeled "semi-permanent" or "volatile," in contrast with the permanent memory available with magnetic core technology. Modern telephone equipment includes the use of volatile memory devices to store small quantities of information such as telephone numbers. Even here, the annoyance of having to re-enter data after a power interruption is unacceptable.

A number of techniques exist for switching from one voltage source to another when the primary voltage source falls below a predetermined threshold. One prior art technique is disclosed in U.S. Pat. No. 4,122,359 entitled Memory Protection Arrangement and issued to Breikss. In this patent, diodes are used to connect a pair of power supplies to a load—one of the power supplies being a battery. This technique not only incurs a significant voltage drop penalty across the diode, but allows both power supplies to be on simultaneously under certain conditions. Another technique is disclosed in U.S. Pat. No. 3,557,003 entitled Automatic Battery Switching Device, and issued to Behr et al. In this patent, bipolar transistors are used to transfer power between working and standby batteries when the voltage level of the presently operating battery falls below a threshold level. Associated with this configuration are bias and leakage currents that may adversely effect the selected battery.

In applications utilizing low power metal oxide semiconductor (MOS) memory devices and/or microprocessors, the use of a substantially permanent lithium battery (i.e., soldered onto a circuit board) is highly desirable for both cost and size considerations. Permanently mounted lithium batteries present certain problems, however, not solved by the above-identified patents. For example, lithium batteries can tolerate only minimum reverse bias current before damage results. Further, the useful life of non-rechargeable batteries is directly related to leakage current when the battery is not in use.

In a telephone application, where power is derived from the telephone line, only a minimum voltage may be available and it is imperative that the power supply switching apparatus cause little or no voltage drop to the load or require bias currents of a magnitude that would measurably reduce the available voltage. The mere replacement of bipolar transistors, requiring significant bias current, with high impedance MOS transistors, requiring virtually none, brings along additional properties that heretofore have largely been ignored in connection with power supply switching arrangements. One such property is the presence of a fully bilateral switch in connection with a battery that cannot tolerate reverse currents.

It is therefore an object of the present invention to provide a power supply switching arrangement having minimum voltage drop that maximizes the useful life of a secondary battery, such as one of lithium construction, through substantial elimination of leakage and reverse bias currents.

It is another object of this invention to provide an arrangement of minimum size and cost that may be readily incorporated in the monolithic construction of MOS devices.

SUMMARY OF THE INVENTION

A power supply switching arrangement is disclosed that switches between a primary and a secondary voltage source when the voltage level of the primary source drops below a predetermined threshold. In a preferred embodiment of the invention, first and second MOS transistor devices are connected between the primary and secondary voltage sources, respectively, and a load. Sequencing means are provided to assure that only one transistor is on at a time, and further, that both transistors are simultaneously off before a presently off transistor can turn on. In one embodiment of the invention the sequencing means comprises a comparator circuit having plural time constants for switching transistors on and off to insure that before switching can occur, both transistors are first in an off state. In another embodiment of the invention, the sequencing means utilizes a pair of comparator circuits responsive to the level of the primary voltage; each comparator is arranged to switch at a different threshold voltage. The thresholds are designed to assure that whenever switching occurs, both transistors will first be in an off state.

DETAILED DESCRIPTION

Figure 1:
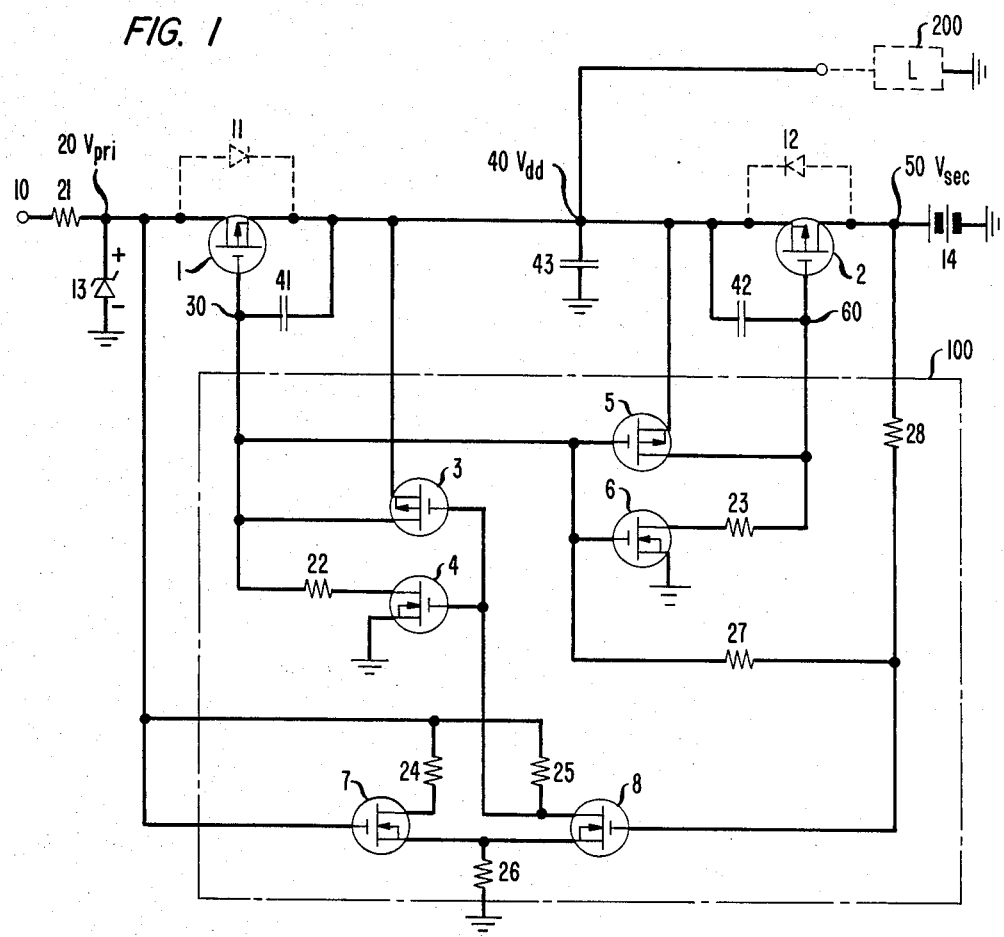
FIG. 1 is a schematic diagram of a power supply switching arrangement in accordance with the invention.

FIG. 1 discloses, in schematic form, a power supply switching arrangement for switching between primary and secondary sources of power. In this illustrative embodiment of the invention, power is derived from a telephone line through, perhaps, a polarity guard circuit to input node 10. A primary voltage ($V_{pri}$) is established at node 20 by the combination of resistor 21 and Zener diode 13. For the purpose of example, a 3.3 volt Zener diode is used in conjunction with 3K ohm resistor 21. A secondary voltage source is advantageously provided by lithium battery 14, which is 3.0 volts in this example. The secondary voltage ($V_{sec}$) is present on node 50 in the indicated polarity. Battery 14 is soldered to the printed wiring board, and is therefore substantially permanent. It is important to minimize its drain when not in use so as to extend its useful life; further, it is important to keep the battery from becoming reversed biased at any time. Reverse current must be less than 1 microampere to avoid damage both to the battery and possibly to a user.

During normal operation, the primary voltage source at node 20 is supplied to load 200 through supply transistor 1. When the primary voltage source falls below a predetermined threshold, the secondary voltage source at node 50 is supplied to load 200 through supply transistor 2. Sequencing circuit 100 provides the functions of comparing the primary and secondary voltages with each other to determine which source will supply power to the load. Sequencing circuit 100 only allows one of the supply transistors to be on at a time, and further assures that both supply transistors are simultaneously off before switching from one to the other. Such switching involves a time period when neither power supply is powering the load; an interval where capacitor 43, illustratively 0.22 microfarads, supplies power to the load.

Supply transistors 1 and 2 are P-channel MOS devices operating in the enhancement mode. The substrates of these devices are tied together at node 40, labeled $V_{dd}$, so that inherent diodes 11 and 12 provide a fail-safe configuration for the circuit during abnormal voltage conditions. It is noted at this point that the power supply switching arrangement is not limited to positive voltage supplies, but also can accommodate negative voltage supplies by substantially reversing P- and N-channel MOS devices as well as the diode and battery polarities. Substrate connections for N-channel supply transistors 1 and 2 would also be to node 40, which for ease-of-understanding, would be labeled $V_{ss}$. Although the present invention is preferably included in the monolithic construction of the load serviced (typically a microprocessor or memory device), separately mounted MOS components such as the MC14007UB from Motorola, are acceptable.

Sequencing circuit 100 includes a circuit comprising N-channel MOS transistors 7 and 8 for comparing the primary supply voltage present on the gate lead of transistor 7 with a threshold voltage derived from the secondary supply voltage present on the gate lead of transistor 8. Hysteresis is used to establish a pair of threshold voltages through a voltage divider network formed by resistors 27 and 28 having values of 22M ohms and 2.2M ohms respectively. A first threshold level of approximately 2.7 volts is set during the time when the $V_{pri}$ supplies power to the load. This voltage is present at the gate of transistor 8 and is established through the voltage divider network of resistors 27, 28 when transistor 4 is turned on thereby causing one side of resistor 27 to be substantially grounded. So long as $V_{pri}$ (normally 3.3 volts) stays above the 2.7 volt threshold, this state will be maintained. A second threshold level of approximately 3.0 volts is set during the time when $V_{sec}$ supplies power to the load. This voltage is present at the gate of transistor 8 and is established through the voltage divider network of resistors 27, 28 when transistor 3 is turned on thereby returning one side of resistor 27 to $V_{dd}$ which is 3.0 volts at this time. So long as $V_{pri}$ is below 3.0 volts, this state will be maintained.

During normal operation, transistor 7 is on which tends to turn transistor 8 off through feedback provided by resistor 26 having a value 100K ohms. Resistors 24 and 25 are each 1M ohms. The output of transistor 8 is high (approximately 3.3 volts) and is presented to the common gate connection of transistors 3, 4 which form an inverter circuit. N-channel transistor 3 is thus turned off and P-channel transistor 4 is turned on to thereby maintain node 30 (the gate of supply transistor 1) in a low state (approximately 0 volts). Supply transistor 1 is turned on when its gate voltage is low, but it cannot be turned on instantly. Capacitor 41 in cooperation with resistor 22 tends to slow the rate at which supply transistor 1 turns on. Capacitor 41 for example is 0.001 microfarads, although the intrinsic gate capacitance of transistor 1 might be used instead, and resistor 22 is chosen to be 10K ohms. It is noted that P-channel transistor 3 has an "on" impedance of approximately 1K ohms so that when it turns on it cooperates with capacitor 41 to turn supply transistor 1 off at a rate ten times faster than it turns on. This provides a mechanism to insure that both supply transistors 1 and 2, prior to switching, are in the off state—a condition which protects battery 14 from reverse bias and excess drain.

In a similar manner, an inverter comprising transistors 5 and 6 is used to control supply transistor 2. During normal operation the voltage at node 30 is low and is connected to the common gates of transistors 5 and 6. In this state, N-channel transistor 6 is off and P-channel transistor 5 is on. A high voltage is thus presented to the gate of supply transistor 2 which keeps it off. Capacitor 42 has a value of 0.001 microfarads and resistor 23 has a value of 10K ohms. They cooperate with respect to supply transistor 2 in the same manner as capacitor 41 and resistor 22 do with respect to supply transistor 1.

Figure 2:
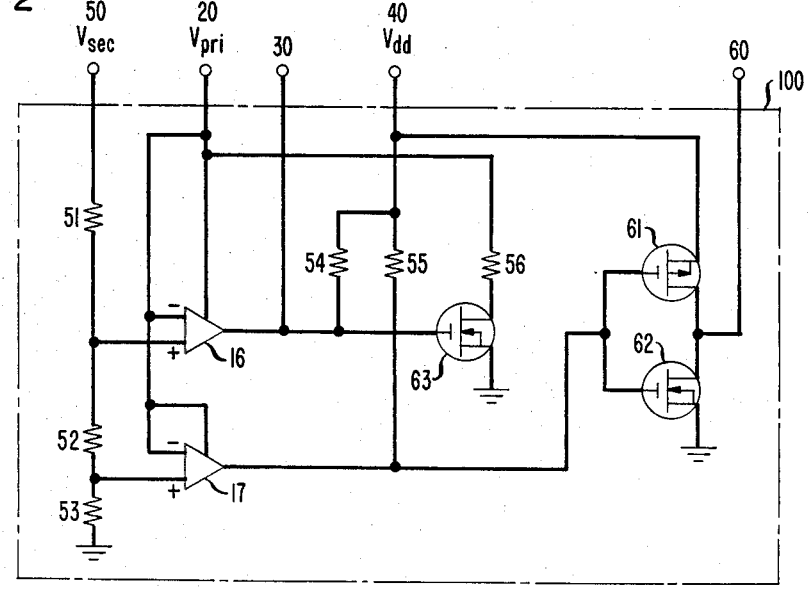
FIG. 2 is a schematic diagram illustrating an alternative design for a sequencing circuit in accordance with the invention.

FIG. 2 discloses, in schematic form, an alternate embodiment of sequencing circuit 100 that utilizes a pair of threshold voltages to assure that supply transistors 1 and 2 of FIG. 1 are simultaneously off before switching from one power supply source to the other. Voltage comparators 16 and 17 are of conventional design, preferably of MOS construction, utilizing pull-up resistors 54 and 55 respectively at their output. Comparators 16 and 17 are utilized to compare the primary voltage available at node 20, with a voltage derived by resistors 51, 52 and 53 from the secondary voltage source. To minimize the battery drain on the secondary supply, the current flow is limited to approximately 0.1 microampere. Illustrative values for resistors 51, 52 and 53 are 3M ohms, 2M ohms and 25M ohms respectively. Assuming a 3 volt secondary supply, comparator thresholds of 2.7 and 2.5 volts exist for devices 16 and 17.

During normal operation both comparators have low output voltages. In this case primary supply transistor 1 is turned on by its gate connection to node 30. The low output voltage from comparator 17 is inverted in transistors 61 and 62. The consequent high voltage at node 60, where secondary supply transistor 2 has its gate connected, causes it to turn off. Note that resistors 54 and 55 are supplied from the voltage available at node 40 which is always available so long as one of the voltage sources is operational.

When the primary voltage falls slightly below 2.7 volts, the output of comparator 16 goes high. At this point in time, both of the supply transistors are turned off—a condition which is desirable, but only for a short time. To assure that this condition is not permanent, N-channel transistor 63 is turned on, thereby placing resistor 56 (10K ohms) in parallel with the load already on the power supply. This additional load provides sufficient positive feedback to cause the primary voltage to drop at least below the 2.5 volt threshold associated with comparator 17, and hence the secondary power supply to become connected to the load through supply transistor 2.

In summary, the disclosed power supply switching arrangement replaces conventional relay, diode and bipolar transistor switching arrangements with their associated drawbacks—including size and cost—as well as reverse leakage and bias currents. It is advantageously used in connection with permanently mounted lithium batteries in a low power application to protect volatile memory devices during a power interruption. The combination of MOS transistor switches and a sequencing circuit, to insure that all switches are off prior to changing voltage sources, provides significant benefits to a large class of electronic equipment. Although the specification only discusses the use of a pair of voltage sources (i.e., primary and secondary), it is clear that three or more may be utilized. Indeed, the notion of turning off all voltage sources before switching to a new one is particularly useful in connection with multiple sources.

What is claimed is:

1. Apparatus for interconnecting one of a plurality of voltage sources with a load comprising,
   metal oxide semiconductor (MOS) transistor means, electrically in series with each of the voltage sources and the load, responsive to control signals for interconnecting the voltage sources with the load, only one of said voltage sources being interconnected at a time;
   sequencing means, generating control signals for turning off all interconnecting MOS transistors when the voltage of the interconnected voltage source falls below a predetermined threshold level, and thereafter for enabling another of the voltage sources; and
   means for supplying voltage to the load during the time interval that all interconnecting MOS transistors are turned off.

2. The apparatus of claim 1 further including means for raising the level of the predetermined threshold after the voltage of the interconnected voltage source has fallen below said predetermined threshold, whereby regenerative switching speeds the interconnection of voltage sources.

3. The apparatus of claim 1 further including means for additionally loading the interconnected voltage source after its level has fallen below said predetermined threshold, whereby regenerative switching speeds the interconnection of voltage sources.

4. The apparatus of claim 1 wherein the interconnecting MOS transistors have their substrates electrically connected to the load, whereby fail-safe operation is achieved.

5. The apparatus of claim 1 wherein at least one of the voltage sources comprises a lithium battery, mounted to a printed wiring board in a substantially permanent manner.

6. The apparatus of claim 1 wherein the sequencing means includes first and second comparators, the first comparator being jointly responsive to the voltage level of one of the voltage sources and to a first threshold voltage, for turning off the MOS transistor interconnecting said one of the voltage sources and the load, the second comparator being jointly responsive to the voltage level of said one of the voltage sources and to a second threshold voltage having a magnitude less than the first threshold voltage, for turning on the MOS transistor interconnecting another of the voltage sources and the load.

7. A method for switching from a working voltage source to a standby voltage source with metal oxide semiconductor (MOS) transistors interconnecting each voltage source and a load comprising the steps of:
   comparing the voltage level of the working voltage source to the voltage level of a predetermined threshold;
   switching all MOS transistors to an off state when the voltage level of the working voltage source falls below the voltage level of the predetermined threshold;
   supplying voltage to the load from a capacitor during the time interval when all MOS transistors are in the off state; and
   switching the MOS transistor, associated with the standby voltage source, to an on state before the voltage stored on the capacitor is substantially reduced.

8. A telephone set, including apparatus for providing power to memory storage devices during power interruptions, said apparatus including P-channel metal oxide semiconductor (MOS) transistors interconnecting a primary and a secondary power source with the memory storage device,
   characterized by
   means responsive to a decrease in the primary voltage to a point below a threshold level for turning off the MOS transistor interconnecting the primary power source and the memory storage device, and for turning on the MOS transistor interconnecting the secondary power source and the memory storage device;
   means for delaying the turning on of the MOS transistor interconnecting the secondary power source and the memory storage device; and
   capacitor means for supplying voltage to the memory storage device during the time interval that all MOS transistors are turned off.

9. The telephone set of claim 8 further characterized by means for raising the threshold level at which switching from the primary to the secondary power source is activated after the level of the primary power source has fallen below the threshold level, whereby regenerative feedback increases the speed of switching between power sources.

10. A telephone set, including apparatus for providing power to memory storage devices during interruptions, said apparatus including P-channel metal oxide semiconductor (MOS) transistors interconnecting a primary and a secondary power source with the memory storage device,
    characterized by
    first comparator means, jointly responsive to the voltage level of the primary power source and to a first threshold voltage, for turning off the MOS transistor interconnecting the primary power source and the memory storage device;
    second comparator means, jointly responsive to the voltage level of the primary power source and to a second threshold voltage, for turning on the MOS transistor interconnecting the secondary power source and the memory storage device, the second threshold voltage having a magnitude less than the magnitude of the first threshold voltage; and
    capacitor means for providing voltage to the memory storage device during the time interval that the magnitude of the voltage level of the primary power source is less than the first threshold voltage, but greater than the second threshold voltage.

11. The telephone set of claim 10 further characterized by means for increasing the current drain on the primary power source after the level of said primary power source has fallen below the first threshold voltage, whereby feedback is introduced to increase the speed of switching between power sources.

* * * * *